United States Patent [19]

Tyagi et al.

[11] Patent Number: 5,454,948
[45] Date of Patent: * Oct. 3, 1995

[54] SEMI-CONTINUOUS BACTERIAL LEACHING PROCESS

[75] Inventors: Rajeshwar D. Tyagi, Ste-Foy; Jean-François Blais, Beauport; Jean C. Auclair, Ste-Foy, all of Canada

[73] Assignee: Institut National de la Recherche Scientifique, Canada

[*] Notice: The portion of the term of this patent subsequent to Jun. 8, 2010 has been disclaimed.

[21] Appl. No.: 109,988

[22] Filed: Aug. 23, 1993

Related U.S. Application Data

[63] Continuation of Ser. No. 693,650, Apr. 30, 1991, abandoned.
[51] Int. Cl.$^6$ .............................. C02F 3/34; C02F 11/00
[52] U.S. Cl. ......................... 210/611; 210/631; 210/912
[58] Field of Search .................... 210/609–613, 210/620, 631, 912; 435/252.1, 252.4, 252.5, 282, 822, 832

[56] References Cited

U.S. PATENT DOCUMENTS

| | | | |
|---|---|---|---|
| 3,627,676 | 12/1971 | Eccles, Jr. | 210/611 |
| 3,878,303 | 4/1975 | Hashimoto | 210/612 |
| 4,155,810 | 5/1979 | Kitajima et al. | 435/832 |
| 4,206,288 | 6/1980 | Vetz et al. | 435/282 |
| 4,596,778 | 6/1986 | Hitzman | 435/252.1 |
| 4,775,627 | 10/1988 | Attia et al. | 435/282 |
| 4,790,940 | 12/1988 | Castaldi et al. | 210/611 |
| 4,918,018 | 4/1990 | Waskovsky | 435/252.1 |
| 5,002,888 | 3/1991 | Kilbane, II | 435/252.4 |

OTHER PUBLICATIONS

Couillard et al., Bacterial Leaching of Heavy Metals from Aerobic Sludge, Bioresource Technology, 1991, 36:293–302.
Anderson et al., Improvement in aerobic sludge disgestion through pH control: initial assessment of pilot–scale studies[1], Can. J. Civ. Eng. 1987, 14:477–484.
Anderson et al, Aerobic sludge digestion with pH control–preliminary investigation, Journal WPCF, Jul. 1984, 57(7):889–897.
Martin, Jr. et al, Reductions of Enteric Microorganisms During Aerobic Sludge Digestion, Wat. Res., 1990, 24(11):1377–1385.
Henry et al, Fate of indicator organisms in sludge during bacterial leaching of metals[1], Can. J. Civ. Eng., 1991, 18:237–243.
Hayes et al., "Heavy Metal Removal From Sludges Using Combined Biological/Chemical Treatment", 34th P.I.W.C. 1979 Ed. J. M. Bell, Pub, Ann Arbor Science, pp. 529–543.
Jenkins et al., "Metals Removal and Recovery from Municipal Sludge", Journal WPCF, vol. 53, No. 1, Jan. 1981.
Int'l Metallurgical Rev., Rev. 179, vol. 19, No. 3, Mar. 1974 pp. 25–31, Use of Micro–Organisms for the Recovery of Metals.
GWF Wasser Abwasser vol. 120, No. 7, Jul. 1979, pp. 329–335 Entfernung Von Schwermetallen Aus Kkarschlammen Durch Bakterielle Laugung, Schonborn et al.

*Primary Examiner*—Thomas Wyse
*Attorney, Agent, or Firm*—Cushman Darby & Cushman

[57] ABSTRACT

The present invention relates to a semi-continuous process for removing heavy metals, substantially reducing volatile suspended solids and substantially destroying indicator bacteria from municipal sludges, which comprises: a) adding 1 to 3 g of sulphur per liter to a volume of municipal sludge and allowing the sulphur oxidizing thiobacilli initially present in said sludge to proliferate under aerobic conditions in said sludge being agitated until the pH of said sludge is lowered to about 1.5 to 2.5 which causes heavy metals present in said sludge to be substantially solubilized, the concentration of volatile suspended solids is substantially reduced and the concentration of indicator bacteria to be lowered to a non-toxic level; b) removing about 90% of said low pH sludge and recovering the solubilized heavy metals therefrom; c) adding about 90% of municipal sludge to the remaining low pH sludge of step b), thereby resulting in a sludge mixture having a pH of about 7 to 8; and d) repeating steps a) to c); whereby the thiobacilli are adapted when the time required for lowering the pH of the sludge to 1.5 to 2.5 is about the same in two successive operations.

3 Claims, 4 Drawing Sheets

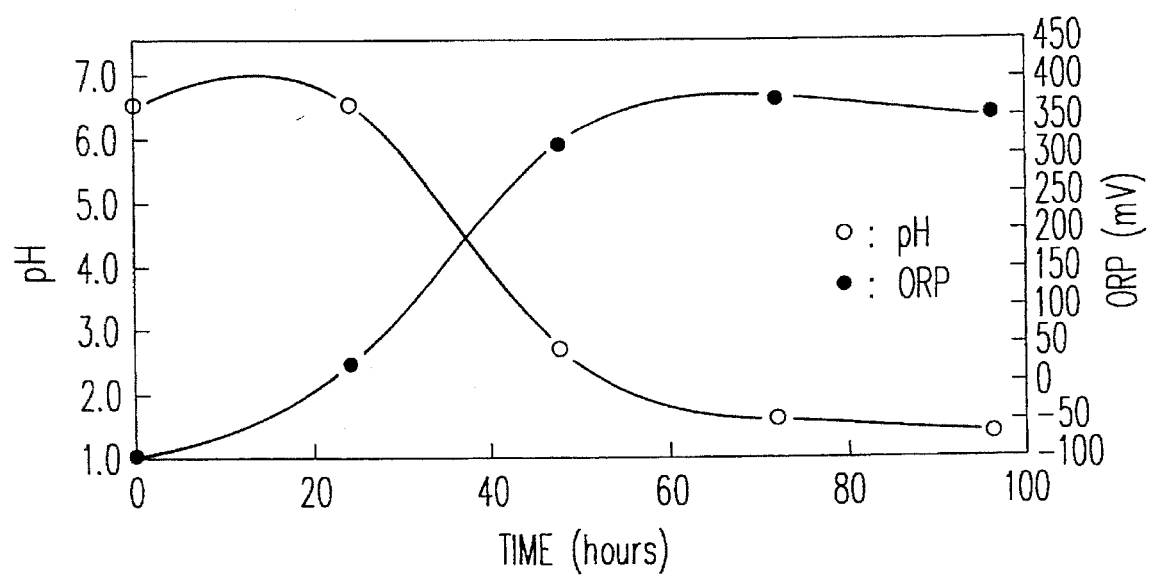
_FIG_ _5A_
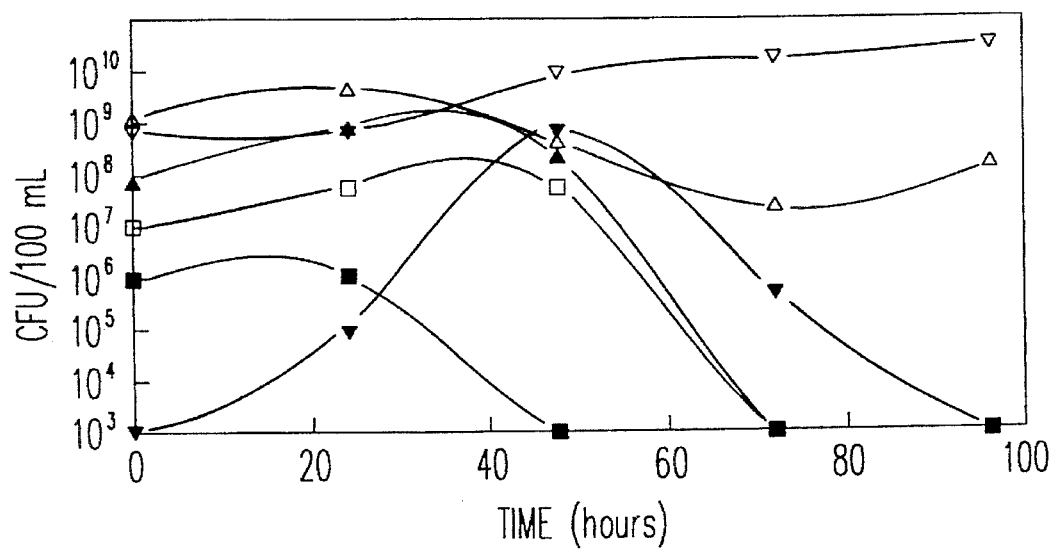
△ : TOTAL AEROBIC COLONIES   ■ : FECAL STREPTOCOCCI
▲ : TOTAL COLIFORMS           ▽ : ACIDOPHILIC THIOBACILLU
□ : FECAL COLIFORMS           ▼ : LESS-ACIDOPHILIC THIOBACILLI
_FIG_ _5B_

SEMI-CONTINUOUS BACTERIAL LEACHING PROCESS

This is a continuation of application Ser. No. 07/693,650, filed on Apr. 30, 1991, now abandoned.

BACKGROUND OF THE INVENTION

Sewage treatment plant operations usually generate important quantities of residual sludges. Million of tonnes of sewage sludges are produced worldwide every year. The treatment and final disposition of residual sludges often constitutes the most expensive stage in the treatment of municipal wastewaters and remains a difficult environmental issue.

The main concern in the disposal of the sludge is the presence of toxic heavy metals in the sludge. Heavy metals are concentrated in sewage sludge during the treatment of sludges due to various physio-chemical and biological interactions. The heavy metal content of sewage sludge is about 0.5 to 2% on a dry weight basis. In some cases, extremely high concentrations (up to 4% w/w) of Cd, Cr, Cu, Ni, Pb and Zn have been reported.

Several optional methods for the disposal of municipal sludges could be utilized such as land filling, incineration, oceanic dumping and spreading on agricultural and/or forest lands as fertilizer.

However, the presence of elevated concentration of heavy metals present a serious constraint to the implementation of these practices.

Disposal of heavy metal contaminated sludge by these practices pose the following potential risks and problems:

1) Disposal of the metal contaminated sludge in the marine environment involves the danger of accumulation of heavy metals in marine species especially in those which are used for human consumption.
2) High levels of heavy metals released from the sludge can have toxic and lethal effects on marine life.
3) Incineration is costly due to high energy consumption. Moreover heavy metals which remain with the incinerator ashes must be removed before the ash is finally disposed.
4) The biggest risk associated with land filling of the metal contaminated sludge and/or ash, and spreading of the sludge on agricultural and/or forest lands is leaching of heavy metals into surface and ground waters. These may have serious consequences where these waters are used for drinking/recreation by humans and animals.
5) Disposal of the sewage sludge on agricultural land is one of the most economical means of disposal because of its characteristics of being a good fertilizer. However, uptake of heavy metals by plants and the subsequent accumulation of metals in the food chain via plants and animals can be a potential health hazard.

Epidemiological studies to determine disease transmission following the use of sludges as a fertilizer were conducted. These studies have shown that risk of infection is associated with the presence of indicator bacteria and helminthic worms.

To prevent environmental pollution and health risks by heavy metals, the content of heavy metals of sewage sludge must be reduced up to a level recommended by the guidelines of various regional municipalities and local governments. The reduction of heavy metals in sewage sludge can be achieved; (I) by source control of discharge to sewer systems or (II) by removing metals from sludge. In source control, the major difficulty resides in the identification of the sources. Moreover, even with complete elimination of toxic metals from all industrial discharges to sewers, the problem remains because of the metal content of domestic wastewater and run off water. Therefore, to reduce environmental pollution and health hazards by heavy metals from sewage sludge, the heavy metals must be removed before its final disposal. Since large quantities of sludge are generated every day, the process of heavy metals removal should be easy to operate as well as rapid and economical.

Several chemical processes for the removal of heavy metal have been proposed (Hayes et al., 1980 Proc. 34th Ind. Waste Conference, Purdue University, West Lafayette, Ind., pages 529–543; Jenkins et al. 1981 J. Water Pollution Control Fed., 53, pages 25–32). The acid leaching has resulted in efficient extraction of metals, however, the high operational costs have prevented its widespread use.

Recently, studies have been undertaken to extract metal from wastewater sludges using *Thiobacillus ferroxidans*, a microorganism which had been successfully used to recover metals from mine tailings. However, the requirement of lowering the initial sludge pH to 4.0 and the addition of ferrous sulphate substrate has increased the operational costs of this approach.

There are several short comings in the available chemical and microbial methods to remove heavy metals from sewage sludge. They are summarized as follows:

1) Chemical methods which are often associated with consumption of acids ($H_2SO_4$, HCl $HNO_3$, acetic acid and EDTA) are unattractive due to high cost owing to large acid and lime requirements (0.5 to 0.8 g of $H_2SO_4$ per g of dry sludge). Operational difficulties including the requirement of acid-corrosion resistant apparatus and safe storage and transportation facilities for acid put constraints on its utilization.
2) Removal efficiencies for Fe, Zn, Ni and Cr in 24 hours were more than 76% in the acid treatment methods but Cu could not be solubilized.
3) Combination of heating (95° C.) and acidification (pH 2.0 to 3.5, 10 to 60 minutes) improved Zn and Ni solubilization but Cu could not be solubilized.
4) Microbial process (in terms of chemical requirements) is 80% cheaper than chemical processes but requires 10 to 14 days (batch time) of incubation time to remove heavy metals from sewage sludge at initial pH 4.0.
5) In the microbial process, addition of ferrous sulphate (up to 20 g/L) enhanced the solubilization of heavy metals to reduce the bioreaction time to 3–4 days (batch time) in the presence of *T.ferrooxidans*. Moreover, acid addition was also required to adjust pH 4.0.
6) Elemental sulphur is a cheaper substrate but most of the S-oxidizing organisms decrease pH of the synthetic medium (9k with 0.5 g/L $K_2HPO_4$) at a maximum rate of 0.4 units per day (15 to 23 days). *T.ferrooxidans* and *T.thiooxidans* lowered the pH of sewage sludge from 5.5 to 1.0 in 32 days at 1% sulphur level, so very long bioreaction time was required.
7) Most of the acidophilic S-oxidizing bacteria require an initial pH of 4.0 to start the S-oxidation reaction. Therefore, acid is required to lower the pH of the sludge and hence increasing the cost.
8) *Sulpholobus acidocaldarius* is a fast S-oxidizing organism but require high temperature (55° to 85° C.) for the growth.

It would be highly desirable to have a process which could concurrently remove metals and destroy indicator bacteria in municipal sludges to such levels, compatible with agricultural use of the sludges and without all the above-mentioned drawbacks. The process should have the following characteristics:

1) should function at initial sludge pH;
2) the bioreaction time should be as small as possible to reduce the reactor size;
3) metals (Cu, Cr, Ni, Zn, Cd, Pb and Mn) should be solubilized to an acceptable level determined by the guidelines for the land application of municipal sludge;
4) should require a cheaper substrate (or energy furnishing material for microbial growth) which can be stored and transported easily;
5) expensive and difficult to operate apparatus are not required;
6) the process should be operational at room temperature;
7) adaptation of metal leaching bacterial strains to the municipal sludge and their maintenance should be easy without requiring much of the skill;
8) the process of metal leaching should be compatible with the aerobic sludge digestion process; and
9) the process of metal leaching should also reduce the biological mass in sewage sludge which would be measured in terms of the reduction in the concentration of volatile suspended solids.

Accordingly, it would be highly desirable, if the bacterial strains present naturally in all the municipal sludge could be adapted at the same treatment plant, the problem of strain maintenance could be minimized. This invention is related to the adaptation of indigenous thiobacilli (present naturally in all municipal sludges) to solubilize toxic metals.

It would also be desirable to have such a process which would be a semi-continuous process.

SUMMARY OF THE INVENTION

Surprisingly and in accordance with the present invention, there is provided a semi-continuous process for removing heavy metals, substantially reducing volatile suspended solids and substantially destroying indicator bacteria from municipal sludges, which comprises:

a) adding 1 to 3 g of sulphur per liter to a volume of municipal sludge and allowing the sulphur oxidizing thiobacilli initially present in said sludge to proliferate under aerobic conditions in said sludge being agitated until the pH of said sludge is lowered to about 1.5 to 2.5 which causes heavy metals present in said sludge to be substantially solubilized, the concentration of volatile suspended solids is substantially reduced and the concentration of indicator bacteria to be lowered to a non-toxic level;

b) removing about 90% of said low pH sludge and recovering the solubilized heavy metals therefrom;

c) adding about 90% of municipal sludge to the remaining low pH sludge of step b), thereby resulting in a sludge mixture having a pH of about 7 to 8; and d) repeating steps a) to c);

whereby the thiobacilli are adapted when the time required for lowering the pH of the sludge to 1.5 to 2.5 is about the same in two successive operations.

There is also provided a process for the adaptation of sulphur oxidizing thiobacilli present in municipal sludges, removing heavy metals, substantially reducing volatile suspended solids and substantially destroying indicator bacteria from municipal sludges, which comprises:

a) adding 1 to 3 g of sulphur per liter to a volume of municipal sludge and allowing the sulphur oxidizing thiobacilli initially present in said sludge to proliferate under aerobic conditions in said sludge being agitated until the pH of said sludge is lowered to about 1.5 to 2.5 which causes heavy metals present in said sludge to be substantially solubilized, the concentration of volatile suspended solids is substantially reduced and the concentration of indicator bacteria to be lowered to a non-toxic level;

b) removing about 90% of said low pH sludge and recovering the solubilized heavy metals therefrom;

c) adding about 90% of municipal sludge to the remaining low pH sludge of step b), thereby resulting in a sludge mixture having a pH of about 7 to 8; and d) repeating steps a) to c) until the time required for lowering the pH of the sludge to 1.5 to 2.5 is about the same in two successive operations.

When used herein the term "indicator bacteria" is intended to comprises fecal streptococci, fecal coliforms and total coliforms.

The term "sulphur oxidizing, bacteria" is intended to include any bacteria found in municipal sludge and which by their nature are such that they have the ability to oxidize sulphur. In some municipal sludge such sulphur oxidizing bacteria has been found to be *Thiobacillus thiooxidans* and *Thiobacillus thioparus*, but it is obvious to one skilled in the art that municipal sludges can also contain other sulphur oxidizing bacteria.

When used herein the term "non-toxic level" is intended to include any concentration of indicator bacteria at a level compatible with the recommended norms for agricultural use.

The process of the present invention causes the biological mass of the sludge to be reduced and this is measured in terms of a reduction in the concentration of volatile suspended solids.

Other advantages of the present invention will be readily illustrated by referring to the following description.

BRIEF DESCRIPTION OF THE DRAWINGS

FIG. 5 shows a curve of variations of the microbial populations, pH and Oxidation Reduction Potential (ORP) during the bacterial leaching with Black Lake concentrated secondary sludge.

DETAILED DESCRIPTION OF THE INVENTION

Figure 1:
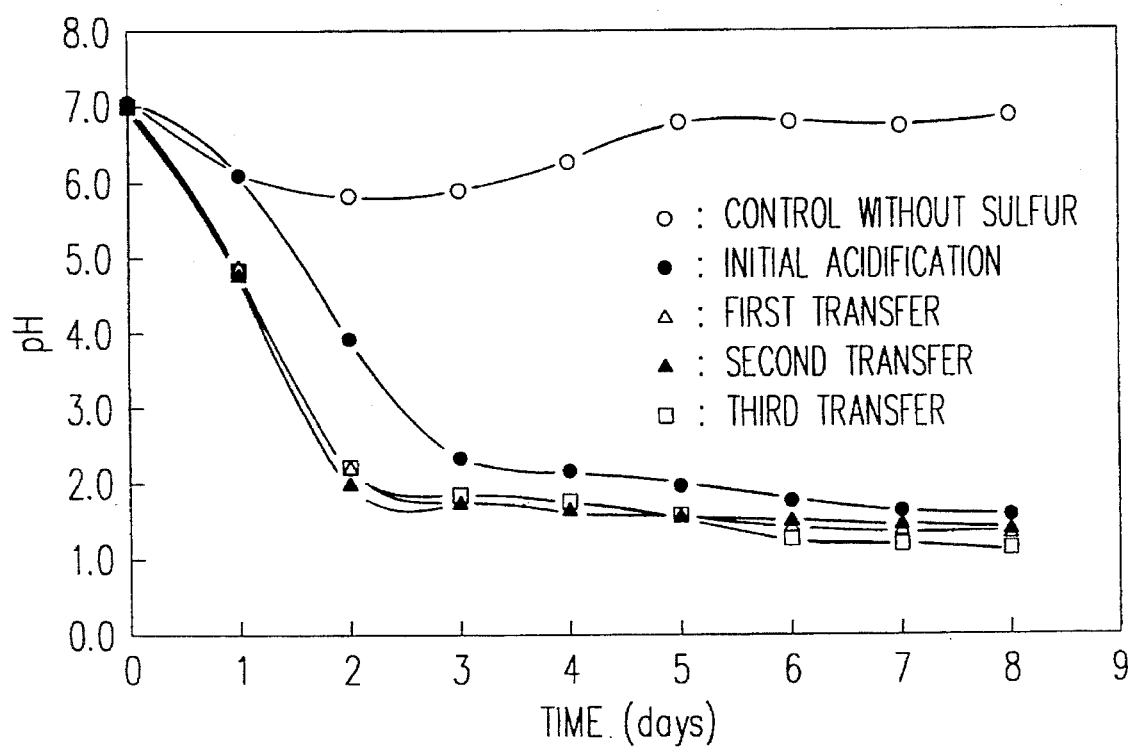
FIG. 1 shows an adaptation curve for the indigenous microbial populations (thiobacilli) for metal leaching evaluated by the acidification as a function of time (Beauceville secondary sludge).

The semi-continuous process according to the present invention, for removing heavy metals, substantially reducing volatile suspended solids and substantially destroying indicator bacteria from municipal sludges, is generally conducted as follows.

Municipal sludges (pH of about 7 to 8) are transferred to a large vat and 1 to 3 g of sulphur per liter is added.

The sulphur and sludge mixture is aerated and agitated for a few days while constantly measuring the pH of the mixture. The sulphur oxidizing Thiobacilli present in the sludge, will oxidize sulphur which will result in the production of sulphuric acid. When the pH of the mixture is lowered to 1.5 to 2.5 due to the higher concentration of sulphuric acid, the heavy metals (Cu, Zn, Ni, Cr, Cd, Pb, Mn etc. . .) are substantially solubilized, the concentration of volatile suspended solids is substantially reduced and the concentration of indicator bacteria is lowered to a non-toxic level.

90% of the low pH mixture is removed and treated to recover the solubilized heavy metals according to standard methods known to man skilled in the art. These standard methods are not described herein because the present invention deals with a semi-continuous bacterial leaching process. Any method of recovering solubilized heavy metals from municipal sludges will work in accordance with the present invention.

There is added to the remaining low pH sludge, a volume of municipal sludges (90%, pH of about 7 to 8) to obtain a 9:1 ratio of high pH to low pH sludges. The mixed sludges has a pH of about 7 to 8. There is added 1 to 3 g of sulphur per liter of the mixed sludges. The sulphur and sludge mixture is aerated and agitated until the pH value has lowered to about 1.5 to 2.5.

When the pH value is 1.5 to 2.5, 90% of the mixture is removed and treated to recover the solubilized heavy metals.

Again, there is added a volume of sludge (90%, pH of about 7 to 8) to the remaining low pH sludge in a 9:1 ratio. There is added 1 to 3 g of sulphur per liter to the mixed sludges.

The sulphur and sludge mixture is aerated and agitated until its pH value has lowered to about 1.5 to 2.5. A 90% sludge volume is removed and treated to recover the solubilized heavy metals. The other steps are repeated.

When the time required for the pH to lower to about 1.5 to 2.5 is substantially the same for two successive operations, the sulphur oxidizing thiobacilli present in the sludge is adapted.

The adapted sulphur oxidizing thiobacilli is repeatedly subjected to the previous enumerated steps for removing heavy metals from municipal sludges and lowering the concentration of the indicator bacteria to a non-toxic level.

The general steps of the semi-continuous process of the present invention are as follows:

a) adding 1 to 3 g of sulphur per liter of sludges;

b) aerating and agitating;

c) when the pH of the sulphur-sludge mixture is lowered to about 1.5 to 2.5, 90% of the mixture is removed and treated to recover the solubilized heavy metals;

d) a volume (90%) of sludges is added to the remaining low pH sludge in a 9:1 ratio; and e) repeating steps a) to d).

The use of the thiobacilli for the solubilization of heavy metals from municipal sludges is advantageous since they are not natural pathogens toward animals and man.

The municipal sludges which can be treated by the process of the present invention include raw sludges and those which have been subjected to some preliminary treatment such as digestion.

The environmental use requires that the concentrations of sulphur also be minimized, to avoid excessive acidification of soils. For this reason, the use of sulphur pellets or immobilised sulphur with recycling would be very advantageous, given that most of the biomass would be recycled on the pellet surface. An important point is that all sewage sludge types can be utilized, since the thiobacilli strains are already present in the sludges and can be adapted. This process of bioleaching enable to solubilize the metals to a recommended level for the utilization of municipal sludge on agricultural land. The process of the present invention efficiently destroys the indicator bacteria.

The present invention will be more readily understood by referring to the following example which is given to illustrate the invention rather that to limit its scope.

EXAMPLE I

1) Sewage sludge sampling

The twelve sludges are obtained, in the spring 1990, from seven wastewater treatment plants in the province of Québec, Canada: St-Georges-de-Beauce (secondary sludge from an activated sludge unit), Beauceville, Cowansville, Granby and Ste-Claire (secondary sludge from an activated sludge unit and aerobically digested sludge), Black Lake (secondary sludge from a sequential biological reactor and aerobically digested sludge), and Valcartier (secondary sludge from an activated sludge unit and anaerobically digested sludge).

The samples are collected in sterile polypropylene bottles, shipped cold, and kept at 4° C. before utilization. The physical characteristics of the sludges, indicated in Table 1, are determinated according APHA (1989).

TABLE 1

| Physical characteristics of the sewage sludge | | | | |
|---|---|---|---|---|
| | pH | TS (mg/L) | VS (mg/L) | TSS (mg/L) | VSS (mg/L) |
| St-Georges (s) | 6.16 | 7119 | 4462 | 5740 | 4070 |
| Beauceville (s) | 6.31 | 14033 | 8566 | 12813 | 8327 |
| Beauceville (a) | 7.07 | 3873 | 2158 | 2157 | 1547 |
| Black Lake (s) | 6.75 | 4839 | 3205 | 4003 | 2847 |
| Black Lake (a) | 6.41 | 24394 | 12477 | 21927 | 12087 |
| Cowansville (s) | 6.72 | 14774 | 9227 | 14393 | 8893 |
| Cowansville (a) | 6.62 | 30414 | 19354 | 28500 | 19150 |
| Granby (s) | 6.62 | 14280 | 8784 | 13307 | 8353 |
| Ste-Claire (s) | 6.75 | 1688 | 1042 | 1300 | 993 |
| Ste-Claire (a) | 6.53 | 40679 | 22247 | 39520 | 22240 |
| Valcartier (s) | 6.63 | 2831 | 1679 | 1973 | 1324 |
| Valcartier (n) | 7.11 | 15608 | 11037 | 11000 | 7500 |

(s) = secondary sludge.
(a) = aerobically digested sludge.
(n) = anaerobically digested sludge.

2) Sulphur-oxidizing microflora adaptation

The cultures are prepared in 500 mL Erlenmeyer flasks containing 150 mL of each sludge supplemented with 1% of powdered sulphur. The flasks for adaptation and for the leaching experiments are agitated at 200 rpm and 28° C. using a gyratory incubator shaker apparatus model 26® (New Brunswick Scientific Co.) during a 7 or 8 day period. Five mL samples are drawn each day for pH measurement.

After an initial pH decrease (<2.5), 150 mL of untreated sludges containing 1% of sulphur is inoculated with 5% of acidified sludges, and these media are incubated. This step is repeated two more times.

The addition of 1% S to sludge causes a pH decrease to 2.0 in a period of 4.5 to 8 days (Table 2).

TABLE 2

Time period required for sewage sludge acidification (pH 2.0) by the sulphur-oxidizing indigenous microflora

|  | before adaptation (hours) | after adaptation (hours) |
|---|---|---|
| St-Georges (s) | 115 | 52 |
| Beauceville (s) | 120 | 48 |
| Beauceville (a) | 144 | 55 |
| Black Lake (s) | 120 | 48 |
| Black Lake (a) | 192 | 48 |
| Cowansville (s) | 133 | 55 |
| Cowansville (a) | 161 | 76 |
| Granby (s) | 196 | 72 |
| Ste-Claire (s) | 168 | 66 |
| Ste-Claire (a) | 116 | 51 |
| Valcartier (s) | 168 | 96 |
| Valcartier (n) | 140 | 74 |

(s) = secondary sludge.
(a) = aerobically digested sludge.
(n) = anaerobically digested sludge.

The adaptation of S oxidizing microorganisms by the inoculation of each sludge with the corresponding acidified sludge allows to reduce the required time of 2 to 4 days for reducing the pH to 2.0. The results presented in Table 2 show that the aerobic digestion or anaerobic sludge digestion does not affect the capacity of adaptation of thiobacilli.

Figure 2:
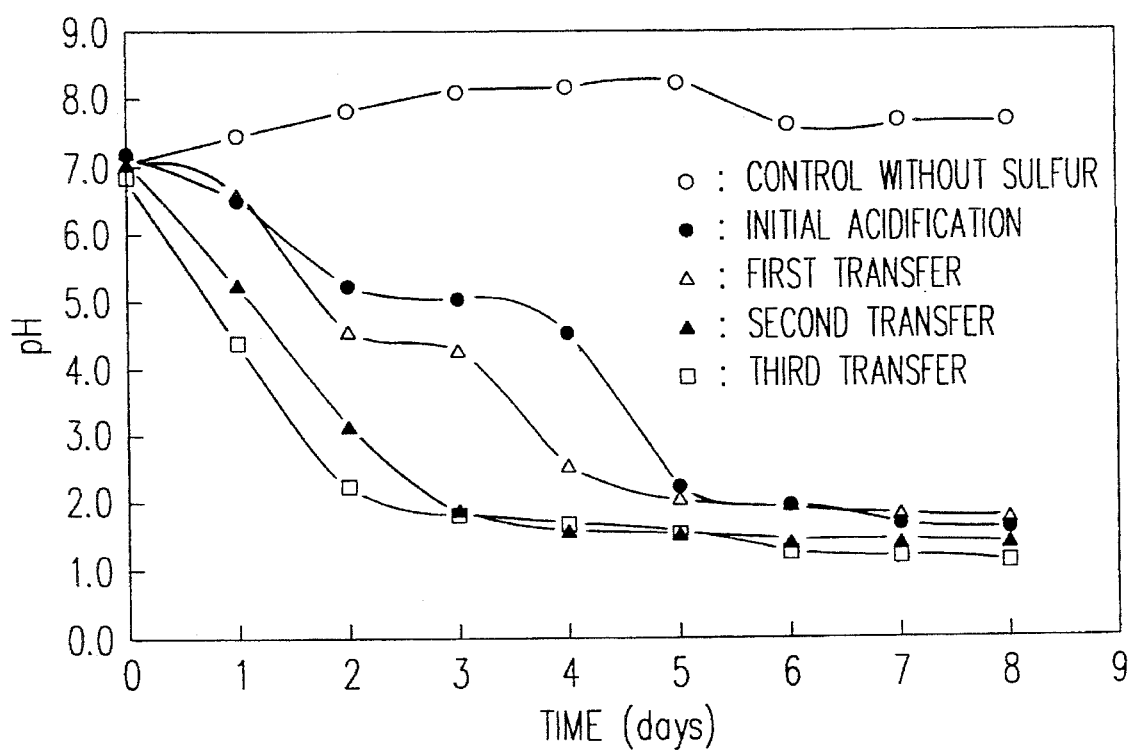
FIG. 2 shows an adaptation curve for the microbial populations for metal leaching evaluated by the acidification as a function of time (Beauceville aerobically digested sludge).

The total solid content (Table 1) does not seems to be a limiting factor the growth of thiobacilli, because the digested sludge from Ste-Claire has a high solids content (4.1%) but shows the high activity of acidogenic bacteria. FIGS. 1 and 2 are the examples of adaptated S oxidizing indigeneous microflora. However, certain sludges like secondary sludge from Beauceville (FIG. 1), attains adaptation in the first transfer, indicating that the non-acidophilic and acidophilii thiobacilli are metabolically active and are presented initially in appreciable concentration. This reduction of pH in one step can also occur due to the growth of thiobacilli like $T.$ $intermedius$, which decreases the pH from 7 to 1.9–2.5 in synthetic medium.

For other sludges, initial acidification is in two steps (FIG. 2); in the first trial, the pH is reduced to 4–5 due to the growth of non-acidophilic thiobacilli and after a lag period the growth of acidophilic thiobacilli decrease the pH to 2.0. Subsequently, the successive transfer of acidified sludge to the fresh sludge permits to adapt the thiobacilli.

3) Heavy metals bioleaching assays

A volume of 200 mL of each sludges is supplemented with 0.5% tyndalized powdered sulphur, and a 10% inoculum (adapted strains) is utilized for the leaching experiments. Fifteen mL samples are withdrawn from the flasks each half-day for chemical analysis. The samples are centrifuged at 20 000×g for 15 min. and elements (metals and sulphur) in the liquid fraction are determined by Plasma Emission Spectroscopy (ICP) with a Thermo Jarrell Ash Corporation, Atom Scan 25® apparatus. To determine metal concentration in sludge, the latter is first digested in $HNO_3$, HF and $HClO_4$ according to APHA (1989). Trace metal concentrations in sludge, as well as recommended levels for agricultural use are shown in Table 3.

TABLE 3

Metal compositions in the sludges and their recommended levels

| | (mg/kg dry sludge) | | | | | | |
|---|---|---|---|---|---|---|---|
| | Cd | Cr | Cu | Mn | Ni | Pb | Zn |
| St-Georges[s] | 4.4 | 91 | 712 | 393 | 69 | 209 | 869 |
| Beauceville[s] | 5.0 | 87 | 215 | 933 | 28 | 110 | 419 |
| Beauceville[a] | 2.6 | 66 | 200 | 1053 | 42 | 234 | 392 |
| Black Lake[s] | 9.2 | 401 | 1070 | 445 | 141 | 278 | 413 |
| Black Lake[a] | 10.0 | 1719 | 1827 | 395 | 177 | 336 | 596 |
| Cowansville[s] | 4.5 | 124 | 737 | 4613 | 30 | 177 | 379 |
| Cowansville[a] | 4.0 | 87 | 625 | 5696 | 26 | 129 | 343 |
| Granby[s] | 2.3 | 99 | 1211 | 2914 | 142 | 266 | 181 |
| Ste-Claire[s] | 0.8 | 349 | 1017 | 1458 | 50 | 43 | 1430 |
| Ste-Claire[a] | 10.7 | 515 | 627 | 933 | 55 | 201 | 1514 |
| Valcartier[a] | 0.9 | 89 | 2065 | 1265 | 65 | 233 | 647 |
| Valcartier[n] | 5.1 | 67 | 1579 | 247 | 13 | 646 | 646 |
| Recommended | 10 | 500 | 600 | 500 | 100 | 300 | 1750 |

[s] = secondary sludge.
[a] = aerobically digested sludge.
[n] = anaerobically digested sludge.

The metal solubilization efficiency for all sludges (Table 4) calculated after 5 days of leaching with the adapted microbial flora and 0.3% sulphur powder permits to reduce the metal concentration in the solid phase to a recommended level.

TABLE 4

Heavy metals solubilisation after 120 hours of microbial leaching with adapted strains

| | (mg/kg dry slugde) | | | | | | |
|---|---|---|---|---|---|---|---|
| | Cd | Cr | Cu | Mn | Ni | Pb | Zn |
| St-Georges (s) | 83 | 45 | 94 | 96 | 97 | 63 | 80 |
| Beauceville (s) | 78 | 19 | 90 | 96 | 95 | 10 | 87 |
| Beauceville (a) | 89 | 17 | 85 | 88 | 94 | 5 | 77 |
| Black Lake (s) | 92 | 46 | 95 | 95 | 94 | 35 | 97 |
| Black Lake (a) | 76 | 37 | 93 | 87 | 89 | 33 | 93 |
| Cowansville (s) | 85 | 32 | 72 | 99 | 59 | 14 | 88 |
| Cowansville (a) | 49 | 13 | 41 | 98 | 46 | 12 | 76 |
| Granby (s) | 99 | 32 | 80 | 93 | 62 | 17 | 76 |
| Ste-Claire (s) | 51 | 16 | 47 | 90 | 48 | 7 | 65 |
| Ste-Claire (a) | 86 | 44 | 71 | 96 | 89 | 45 | 98 |
| Valcartier (s) | 80 | 57 | 86 | 93 | 87 | 38 | 84 |
| Valcartier (n) | 80 | 46 | 86 | 94 | 89 | 40 | 87 | s = secondary sludge.
a = aerobically digested sludge.
n = anaerobically digested sludge.

Figure 3A:
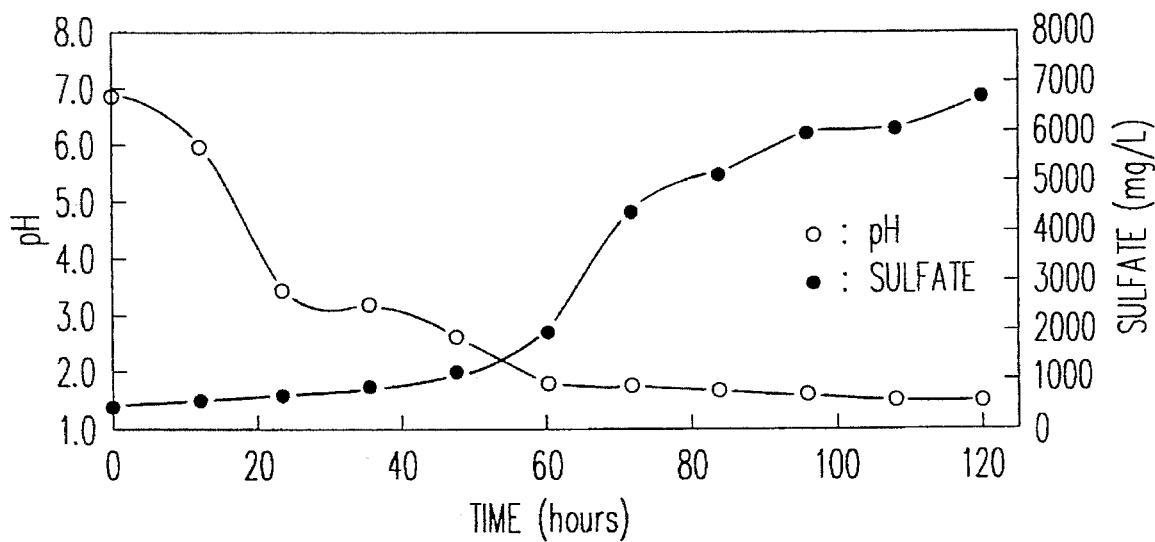
FIG. 3 shows a curve of the metal solubilization, variation of pH, and sulphate production during the bacterial leaching with adapted strain of Ste-Georges secondary sludge.
Figure 3B:
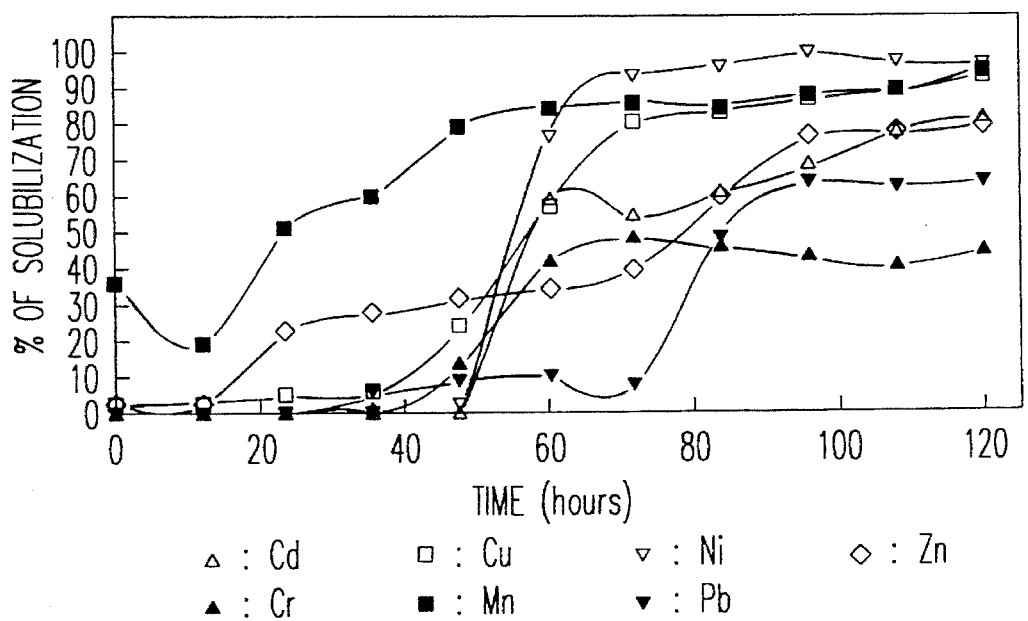
Figure 4A:
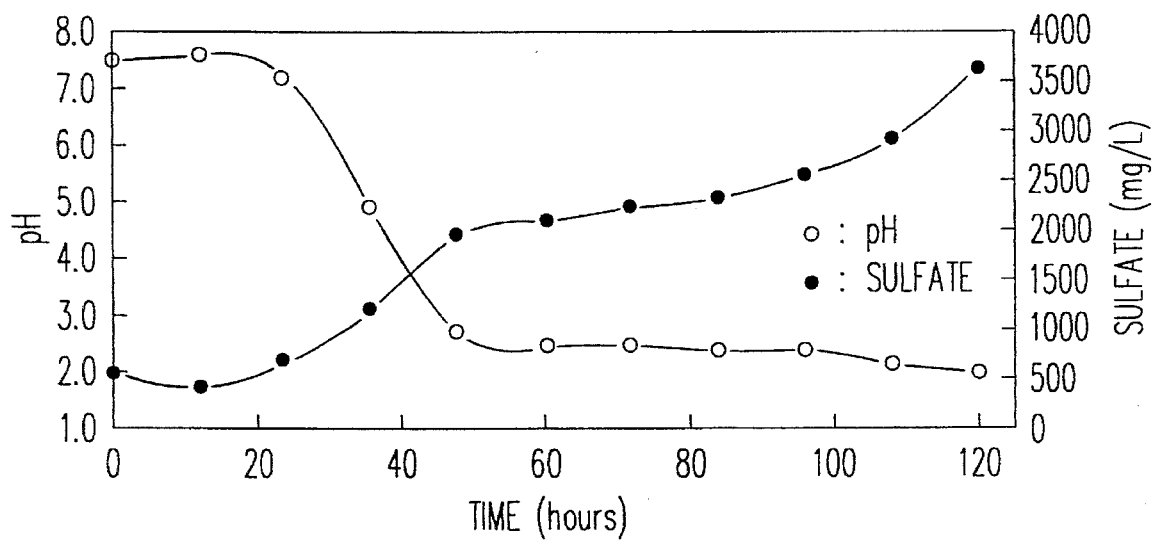
FIG. 4 shows a curve of the metal solubilization, variation of pH, and sulphate production during the bacterial leaching with adapted strain of Cowansville secondary sludge.
Figure 4B:
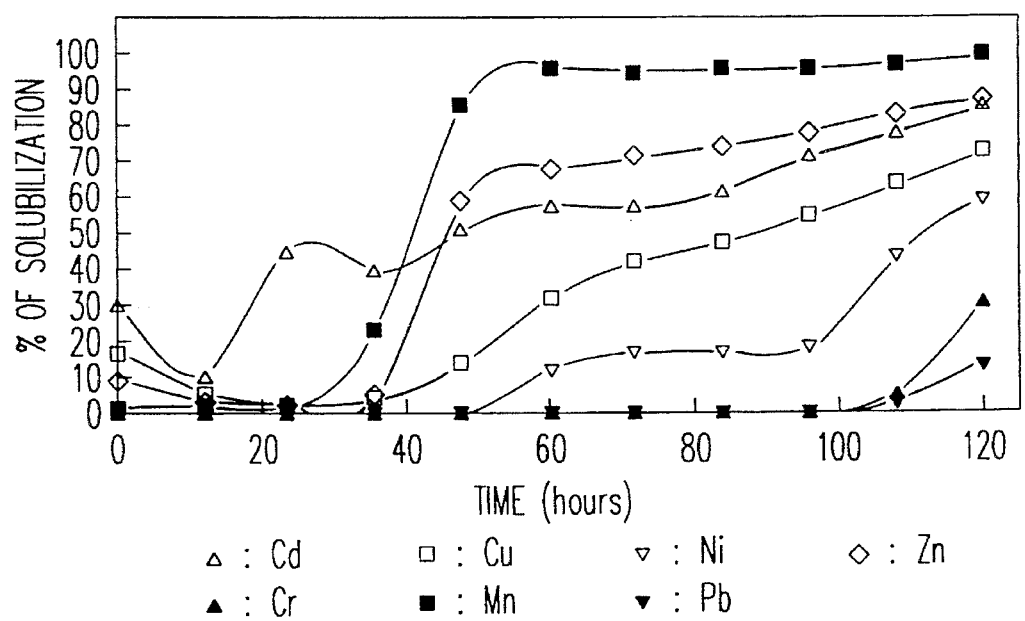

The fraction of oxidized sulphur after 5 days (Table 5), calculated from the quantity of sulphate produced, varies between 6.2% and 56.2% and the pH was decreased to less than 2.5 for all the sludges. The large increase of the oxido-reduction potential (ORP) during the bacterial leaching (FIG. 5) is essential for metal solubilization. In fact, the solubility of metals in sludge is function oh pH, ORP, the concentration of metals and ligands, and the chemical equilibria between the constituants. The utilization of immobilized S in the form of granules will facilitate the recycle of non-oxidized sulphur. FIGS. 3 and 4 present the example of kinetics of metal solubilization during the bacterial leaching. The inspection of these figures show that the type of sludge used and the sludge solids content does not influence the capacity of bacterial leaching process considerably. This phenomena can also be established by examining the metal solubilization obtained in 12 different sludges (Table 4). The yield of solubilization obtained with different sludges used indicates that the process can be used to solubilize metals to a recommended level from all type of sludges.

TABLE 5

Sulphate production, acidification and oxidized
substrat percentage after 120 hours of microbial
leaching with adapted strains

|  | pH | | sulphate | | % of oxidized substrate |
| --- | --- | --- | --- | --- | --- |
|  | ini. | fin. | ini. | fin. |  |
| St-Georges[s] | 6.87 | 1.60 | 468 | 6702 | 41.6 |
| Beauceville[s] | 7.61 | 2.02 | 504 | 2917 | 16.1 |
| Beauceville[a] | 7.71 | 2.20 | 337 | 2926 | 17.3 |
| Black Lake[s] | 6.60 | 1.71 | 392 | 3942 | 23.7 |
| Black Lake[n] | 6.23 | 1.73 | 772 | 7345 | 43.8 |
| Cowansville[s] | 7.39 | 1.98 | 543 | 3573 | 20.2 |
| Cowansville[a] | 7.30 | 2.31 | 630 | 4871 | 28.3 |
| Granby[s] | 6.50 | 2.19 | 529 | 4061 | 23.6 |
| Ste-Claire[s] | 6.96 | 2.32 | 129 | 1060 | 6.2 |
| Ste-Claire[a] | 7.50 | 1.86 | 471 | 8906 | 56.2 |
| Valcartier[s] | 6.82 | 1.90 | 182 | 2449 | 15.1 |
| Valcartier[n] | 7.71 | 1.97 | 654 | 5115 | 29.7 | ini. = initial
fin. = final
[s] = secondary sludge.
[a] = aerobically digested sludge.
[n] = anaerobically digested sludge.

4) Indicator bacteria reduction assays

The inoculum is prepared by growing indigenous sludge *Thiobacillus* strains in 500 mL Erlenmeyer flasks containing 150 mL of the media sludge supplemented with 0.5% of tyndalized powdered sulphur. The flasks for the inoculum preparation and for the experiments are agitated at 200 rpm and 28° C. using a gyratory incubator shaker apparatus model 25® (New Brunswick Scientific Co.). A 5% volume of inoculum is used in all experiments.

The experiment with Black Lake non-digested sludge (FIG. 5) is carried out within 12 hrs after sludge sampling. In this experiment, 3×200 mL of sludge in 500 mL Erlenmeyer flasks is used. The control flask is neither inoculated nor supplemented with sulphur; a second flask is inoculated and supplemented with 0.5% of tyndalized sulphur, and a third containing 200 mL of concentrated sludge (17.41 g/L total solids) is also inoculated and supplemented with sulphur. Five mL samples are drawn each day for chemical and microbiological analysis.

The ten sludge assays are carried out in triplicate; three 200 mL sludge aliquots are added to a 500 mL Erlenmeyer flask and supplemented with 1% (w/v) of sulphur tablets 1.5 cm in diameter by 0.6 cm thick prepared in an aluminum mold according to Bryant et al. (Can. J. Microbiol., 1984, 30, pp. 81–90). Five mL samples are drawn from one of the three flasks at 12 hour intervals for analysis.

All bacterial populations in sludge are enumerated by direct plating on appropriate selective media according to the modified technique of Dudley et al. (1980). Samples are obtained after vortex mixing 5 mL of sludge at high speed for 2 min. with 15 mL of sterile phospate-buffered saline (0.1M, pH 7.2) containing (approximately) 1 g of sterile 4–5 mm diameter glass beads in a 50 mL centrifuge tube. Samples are diluted serially in sterile phosphate-buffered saline, and 0.1 mL samples are spread with sterile glass L-rods over each of the three replicates plates. Commercially available dehydrated media, Difco Laboratories are used in this study, except for thiobacilli media. Total coliforms are assayed on m-Endo agar LES, fecal coliforms are assayed on m-FC agar, fecal streptococci are determined on m-Enterococcus agar, and total aerobic colonies on Standard plate count agar. For the less-acidophilic and acidophilic thiobacilli (Kelley and Harrison, 1988) the $S_2O^2$ synthetic salts agar media described by Laishley et al. (1988) were used at pH 4.0 and 7.0 respectively. Incubation is carried out at 35° C. for 24 h for total coliforms, 35° C. for 48 h for fecal streptococci and total aerobic colonies, and at 44.5° C. for 24 h for fecal coliforms. Thiobacilli plated are incubated at 30° C. for 2 weeks.

For the control sludge, incubation at 28° C. with agitation resulted in a slight increase of pH and OPR and few changes in the heterotrophic population. The concentration of total aerobic microorganisms and total coliforms are slightly increased, while fecal coliforms and fecal streptococci decreased. Autotrophic populations or less-acidophilic thiobacilli are initially undetectable and increased to $2 \times 10^5$ CFU/100 mL after 4 days. These population increase probably occurred through the oxidation of reduced sulphur compounds already present in the sludge. Over a two day period the pH increase, the indigenous acidophilic thiobacilli have diminished to below $10^3$ CFU/100 mL. The addition of a 5% inoculum of microbiologically acidified sludge and 0.5% of sulphur (powder) to the non-digested Black Lake sludge reduced the pH to 2.0 in 48 hours accompanied by a large increase in ORP. The concentration of the total aerobic microorganism is only slightly decreased after a 4 day solubilization period.

However, the initially diverse microflora is replaced by 2 types of dominant colonies (yeast and fungi). The disappearance of indicator bacteria occurs during the first two days at pH's above 2.0. The reduction in the pH occurs through the growth (sulphur oxidation to sulphuric acid) of the less-acidophilic thiobacilli followed by the acidophilic thiobacilli. The reduction in pH below 2.0 during the last two days results in the elimination of the less-acidophilic thiobacilli. The initial pH reduction is slower in the concentrated sludge (17.4 g/L total solids) (FIG. 5) than in the non-concentrated sludge (6.85 g/L total solids); after 48 hours, the pH is 2.7 rather than 2.1. However, after 3 days the pH of both sludges is similar.

It therefore appears that the solids concentration is not an important factor for the growth of the leaching microflora. The disappearance of the fecal streptococci occurred in 2 days (pH>2.7), while the destruction of the coliforms required a pH reduction below 2.7. Irrespective of the sludge origin (Table 6), the elimination of the total coliforms occurs with a large mortality (3 log or under the detection limit of $10^3$ CFU/100 mL) of the indicator bacteria and by extrapolation of most bacterial pathogens.

Bio-solubilization of metals results in the efficient elimination of indicator bacteria. The elimination of indicator bacteria by our process is clearly superior than the results obtained by Henry et al., (A.S.C.E. Nat. Conf. Env. Eng., Jul. 13 & 15, 1988, Vancouver, Canada, pp.369–376). Their process used *Thiobacillus ferrooxidans* and ferrous sulphate as substrate for the treatment of anaerobically digested sludge which is adjusted to pH 4.0. The metal leaching over a 10 day period, with a sludge containing 12 g/L of total suspended solids (TSS) has reduced the fecal streptococci by 3 orders of magnitude, but the total and fecal coliform populations are only slightly raised (Henry et al., 1988, IBID). According to these authors concentration of 10 g/L of TSS appears to be the critical threshold for a significant reduction of bacterial indicators. Moreover, the indicator bacteria destruction by the Henry et al. process is strongly inhibited by high concentration of suspended solids.

The process of the present invention permits the reduction of indicator bacteria to levels compatible with the agricultural use of the sludge, since the coliform concentration encountered (<$10^3$ CFU/100 mL) are similar or lower than concentrations normally found in agricultural soils. The reduction of indicator bacteria is largely due to the production of acid. The acid injury of indicator bacteria is well known. The concentrations of metal ions in solution are comparable to those encountered through the bio-solubilization by *Thiobacillus ferrooxidans*, however, the latter is inefficient in the removal of indicator bacteria.

Comparing the indicator bacteria (total coliform, fecal streptococci) concentrations in sludges after leaching (Table 6, FIG. 5) and the total coliform concentrations obtained after conventional aerobically and anaerobically sludge digestion (EPA, 1979), it appears that thiobacilli mediated acid production appeared more efficient at indicator bacteria removal than the aerobic digestion of sludge.

Table 6 also summarizes the results of reduction in volatile suspended solids (VSS) which ranges from 17.2% to 74.8% depending on the sludge used. The reduction in VSS is compatible with the aerobic sludge digestion process.

TABLE 6

Variations of indicator bacteria and VSS in the sludges after 5 days of microbial leaching

|  |  | pH | ORP (mV) | Total coliforms (CFU/100 mL) | VSS (mg/L) |
|---|---|---|---|---|---|
| St-Georges | i | 6.14 | 17 | $5.07 \times 10^7$ | 4070 |
| (sec.) | f | 2.20 | 362 | $5.73 \times 10^4$ | 3370 |
| Beauceville | i | 6.34 | −152 | $1.20 \times 10^6$ | 8327 |
| (sec.) | f | 1.85 | 370 | <$1.00 \times 10^3$ | 5680 |
| Beauceville | i | 6.82 | −116 | $5.33 \times 10^4$ | 1547 |
| (aer. dig.) | f | 2.10 | 400 | <$1.00 \times 10^3$ | 413 |
| Black Lake | i | 6.06 | −80 | $1.27 \times 10^6$ | 2847 |
| (sec.) | f | 1.70 | 384 | <$1.00 \times 10^3$ | 1013 |
| Black Lake | i | 6.16 | 12 | $7.30 \times 10^4$ | 12087 |
| (aer. dig.) | f | 1.76 | 384 | <$1.00 \times 10^3$ | 9413 |
| Cowansville | i | 6.33 | −169 | $3.23 \times 10^5$ | 8893 |
| (sec.) | f | 1.76 | 391 | <$1.00 \times 10^3$ | 6393 |
| Cowansville | i | 6.55 | −190 | $1.40 \times 10^6$ | 19150 |
| (aer. dig.) | f | 2.14 | 307 | $4.00 \times 10^3$ | 18873 |
| Granby | i | 6.52 | −172 | $1.56 \times 10^6$ | 8353 |
| (sec.) | f | 1.95 | 361 | <$1.00 \times 10^3$ | 4947 |
| Ste-Claire | i | 6.23 | −134 | $7.20 \times 10^7$ | 993 |
| (sec.) | f | 1.72 | 394 | $2.93 \times 10^4$ | 250 |
| Ste-Claire | i | 6.48 | −187 | $2.96 \times 10^6$ | 22240 |
| (aer. dig.) | f | 1.40 | 370 | <$1.00 \times 10^3$ | 17707 | i = initial
f = final
sec. = secondary
aer. dig. = aerobically digested
VSS = volatile suspended solids An important advantage of the process of the present invention, is that all sewage sludge types can be utilized, since the thiobacilli strains can be isolated and adapted to the different sludges. This process of bioleaching process solubilizes metals to recommended levels for the utilization of municipal sludge or agricultural land. In addition, the efficient destruction of indicator bacteria and the possibility of decreasing volatile suspended solids in all the sludges suggests that this technology might replace the conventional aerobic sludge digestion process.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

We claim:

1. A simultaneous sludge digestion and metal leaching semi-continuous process for removing heavy metals, substantially reducing volatile suspended solids and substantially destroying indicator bacteria from municipal sludges, which consists of:

a) adding 1 to 3 g of sulphur per liter to a volume of municipal sludge and allowing the sulphur oxidizing thiobacilli initially present in said sludge to proliferate under aerobic conditions in said sludge under agitation until the pH of said sludge is lowered to about 1.5 to 2.5 and further until heavy metals present in said sludge are substantially solubilized, the concentration of volatile suspended solids is substantially reduced and the concentration of indicator bacteria is lowered to a non-toxic level;

b) removing about 90% of the volume of said low pH sludge and recovering the solubilized heavy metals therefrom;

c) replacing the removed volume of said low pH sludge by adding the same volume of municipal sludge to the remaining low pH sludge of step b), thereby resulting in a sludge mixture having a pH of about 7 to 8; and d) repeating steps a) to c);

whereby the thiobacilli are adapted to conditions of reaction encountered in step a) when the time required for lowering the pH of the sludge to 1.5 to 2.5 is about the same in two successive operations.

2. A process according to claim 1 wherein said time required for lowering the pH of the sludge is of 2 to 4 days, which is the time wherein the thiobacilli are adapted to conditions of reaction encountered in step a).

3. A process according to claim 2 wherein the time in which said heavy metals are substantially solubilized, the concentration of volatile suspended solids is substantially reduced and the concentration of indicator bacteria is lowered to a non-toxic level, is between 2 and 5 days.

* * * * *